(12) United States Patent
Spooner et al.

(10) Patent No.: US 6,318,870 B1
(45) Date of Patent: Nov. 20, 2001

(54) TOGGLE ASSEMBLY FOR REARVIEW MIRROR

(75) Inventors: Ralph A. Spooner, Holland; Jerry L. Beck, Zeeland, both of MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 09/533,127

(22) Filed: Mar. 23, 2000

(51) Int. Cl.[7] .............................. G02B 5/08; G02B 7/182; B60R 1/04
(52) U.S. Cl. .................... 359/872; 359/603; 359/604; 359/606; 248/477; 248/479; 248/481
(58) Field of Search ...................... 359/603, 604, 359/605, 606, 607, 872; 248/476, 477, 479, 481, 549

(56) References Cited

U.S. PATENT DOCUMENTS

| | | | |
|---|---|---|---|
| 3,870,404 | * | 3/1975 | Wilson et al. . |
| 4,319,806 | * | 3/1982 | Brandenburg . |
| 4,359,264 | * | 11/1982 | Zeigler et al. . |
| 4,435,042 | * | 3/1984 | Wood et al. . |
| 4,436,371 | * | 3/1984 | Wood et al. . |
| 4,524,941 | * | 6/1985 | Wood et al. . |
| 4,646,210 | * | 2/1987 | Skogler et al. . |
| 4,679,906 | * | 7/1987 | Brandenburg . |
| 4,807,096 | | 2/1989 | Skogler et al. ........................ 362/142 |
| 4,822,140 | | 4/1989 | Mittelhäuser ........................ 350/279 |
| 4,826,289 | * | 5/1989 | Vandenbrink et al. . |
| 4,882,565 | | 11/1989 | Gallmeyer ............................ 340/461 |
| 5,327,288 | | 7/1994 | Wellington et al. .................. 359/606 |
| 5,521,760 | | 5/1996 | De Young et al. ................... 359/601 |
| 5,576,687 | | 11/1996 | Blank et al. ......................... 340/438 |
| 5,673,994 | | 10/1997 | Fant, Jr. et al. ..................... 362/831 |
| 5,820,097 | * | 10/1998 | Spooner . |

OTHER PUBLICATIONS

Commonly assigned, co–pending U.S. Pat. application, Ser. No. 09/448,700, filed Nov. 24, 1999 by Timothy G. Skiver et al. for Rearview Mirror Assembly with Added Feature Modular Display.

* cited by examiner

Primary Examiner—Ricky D. Shafer
(74) Attorney, Agent, or Firm—Van Dyke, Gardner, Linn & Burkhart, LLP (57) ABSTRACT

A ball and toggle assembly for a prismatic interior rearview mirror of a vehicle comprises a ball and body member and a toggle member. The ball and body member and the toggle member are separately formed from separate polymeric materials and joined together. The flexural moduli of the separate materials are selected such that the ball and body member is substantially rigid while the toggle member is flexible. The toggle member is preferably molded over the body member and secured thereto via a mechanical interconnection of the toggle member material to the body member material. Preferably, the ball and body member comprises an engineering polymer, such as a glass-filled thermoplastic material, while the toggle member comprises a polyolefin, such as a homopolymer or co-polymer polypropylene material.

43 Claims, 7 Drawing Sheets

TOGGLE ASSEMBLY FOR REARVIEW MIRROR

BACKGROUND OF THE INVENTION

The present invention relates generally to interior rearview mirror assemblies for vehicles and more particularly, to a toggle assembly for a prismatic interior rearview mirror movable between day and night, full and partial reflecting positions.

Interior rearview mirrors for vehicles are typically pivotally mounted to a base or mounting arm via a ball and socket joint providing adjustment to accommodate different sizes of drivers. Typically, a dual ball and socket joint assembly is used to increase adjustability over a single ball and socket joint and comprises a mounting base, which is secured to an interior surface of a windshield or to a headliner or console of the vehicle, and an arm which pivotally receives a ball on the mounting base and further pivotally receives a second ball extending forwardly from the mirror assembly. A prismatic mirror may further comprise a toggle assembly which is actuatable to pivot the mirror assembly relative to the arm via movement of a toggle actuating tab. The toggle assembly extends from the mirror assembly and is connected with the ball at the mirror assembly. The ball member typically comprises aluminum, while the toggle assembly may comprise a plastic material, in order to facilitate flexing as the actuating tab is moved to pivot the mirror relative to the arm. The toggle and mirror assemblies are assembled together manually via pivot axles and axle supports or the like and thus require manual handling and alignment of parts after the individual components are formed.

The ball member of the mirror assembly typically comprises zinc or aluminum in order to provide a low cost strong and durable ball for pivotal engagement with the mounting arm. The ball member may then be clamped tightly within the arm to frictionally support the mirror assembly in a secured position, thereby enhancing vibration performance of the mirror assembly. Vibration concerns are greater with many mirror assemblies, which include additional electronic accessories, such as map reading lights or the like, which add weight to the basic mirror assembly and thus require additional support at the joints to hold the mirror in a selected orientation. While the zinc ball allows for tight clamping by the arm, the zinc ball member further adds to the overall mass of the mirror system.

Because the ball member of the mirror assembly typically comprises zinc, aluminum, or other metal, it is often not painted, such that it does not match the color of the mirror assembly or trim of the vehicle. While the ball member is painted in some applications, concerns then arise with respect to frictional variation between the ball and socket joint due to variation in paint thickness along the surface of the ball. Furthermore, the additional process of painting the ball after it is formed adds to the cost of the mirror assembly.

Often, indicators and/or accessories may be placed at the mirror or at the dashboard or instrument panel of the vehicle. As mentioned above, inclusion of such items to the mirror adds to the weight of the mirror which may then require additional support for the mirror. Also, placement of such items at the dashboard or instrument panel makes the indicators or accessories inconvenient to view by a driver or passenger of the vehicle, since the person has to look down from their view of the road in front of the vehicle in order to see and access the indicators and/or accessories.

Therefore, there is a need in the art for a color-matched ball member and toggle actuating tab. The ball member should provide for uniform frictional resistance when retained within a ball and socket joint. Preferably, the ball member will further resist vibration such that the ball member will be useful for modern, heavier mirror assemblies with added features. Preferably, the ball and toggle will provide a reduction in the overall mass of the mirror assembly over the prior art ball and toggle assemblies.

SUMMARY OF THE INVENTION

The present invention is intended to provide a low cost and light weight ball and toggle assembly for a day/night prismatic, interior rearview mirror assembly for vehicles. The assembly is formed from different materials, which have different strength and flexural characteristics, such that the ball comprises a strong, substantially rigid material, while the toggle portion of the assembly comprises a softer, more flexible material.

According to a first aspect of the present invention, a ball and toggle assembly adapted for an interior rearview mirror assembly of a vehicle comprises a body member and a toggle member. The body member comprises a ball member and a base, which are unitarily formed from a first polymeric material which comprises a first flexural modulus. The toggle member comprises a hinge and an actuator tab, which are unitarily formed from a second polymeric material which comprises a second flexural modulus. The body member and toggle member are joined together for support in a mirror housing of the rearview mirror assembly, with the first flexural modulus being greater than the second flexural modulus.

Preferably, the body member, including a ball member and base, comprises a filled polymeric resin material, while the toggle member comprises a polyolefin material. Preferably, the toggle member is molded at least partially around the body member and may be molded through a plurality of openings to mechanically secure the toggle member to the body member. Preferably, the body member and the toggle member are formed in a common color. The body member and/or the toggle member may be formed in a color to match the color of the mirror assembly or trim within the vehicle. For example, one or both members could be molded from a pigmented plastic material, so it could be molded as a dark color, such as black, gray, dark burgundy, dark blue, or any other dark colors, or a light color, such as white, beige, light gray, or other light colors.

According to another aspect of the present invention, an interior rearview mirror assembly for a vehicle comprises a mirror housing, a prismatic, reflective element and a ball and toggle assembly mountable to the housing. The reflective element is supported by the mirror housing. The mirror housing and reflective element are pivotable relative to the vehicle between a first, high reflective position and a second, low reflective position. The ball and toggle assembly is mountable at a forward surface of the mirror housing and comprises a body member and a toggle member. The body member comprises a first polymeric material having a first flexural modulus and includes a mounting member and a base. The toggle member comprises a second polymeric material having a second flexural modulus, which is less than the first flexural modulus. The toggle member comprises a hinge and an actuator tab. The body member and the toggle member are joined together. The toggle member is pivotally mounted at the mirror housing such that movement of the actuator tab about the hinge causes pivotal movement of the mirror housing and reflective element between the high and low reflective positions. The mounting member is pivotally interconnectable to a mirror mount secured to the vehicle such that the mirror assembly, including the housing, reflective element and ball and toggle assembly, is also pivotally adjustable relative to the mirror mount.

According to yet another aspect of the present invention, a mirror mount assembly comprises a mounting base, an accessory housing and at least one accessory positioned within the accessory housing. The mirror mount assembly is adapted for mounting to an interior surface of a windshield of a vehicle and for pivotally mounting an interior rearview mirror assembly thereto. The mounting base is for mounting at the interior surface of the windshield and includes a ball member for pivotal connection to the mirror assembly. The accessory housing extends generally downwardly from the mounting base. Preferably, the accessory comprises an illumination source or indicator, but may otherwise, or additionally, comprise a microphone, an attachment member, a compass sensor, an antenna, or an interface button. The accessory housing may include a lens element such that light from an illumination source within the housing is directed toward a targeted area within a cabin of the vehicle.

Therefore, the present invention provides a ball and toggle assembly which may be formed together to provide a rigid ball member, and a flexible spring and hinge. The ball and toggle assembly may be molded together in different molds or may be integrally formed in a two-shot or two-step molding process. The ball and toggle members may be molded in a color to match an interior color scheme of the vehicle, while still providing substantially uniform frictional resistance between the ball member and a socket of a mounting arm. The ball and toggle assembly is formed from plastic materials, such that the weight is reduced relative to conventional zinc ball members. The mirror mount may include an accessory or indicator, which allows for easier viewing by the driver of the vehicle, since the indicator may thus be positioned in an area generally viewable by the driver while looking forwardly with respect to the vehicle.

These and other objects, advantages, purposes and features of this invention will become apparent upon review of the following specification in conjunction with the drawings.

DESCRIPTION OF THE PREFERRED EMBODIMENTS

Figure 1:
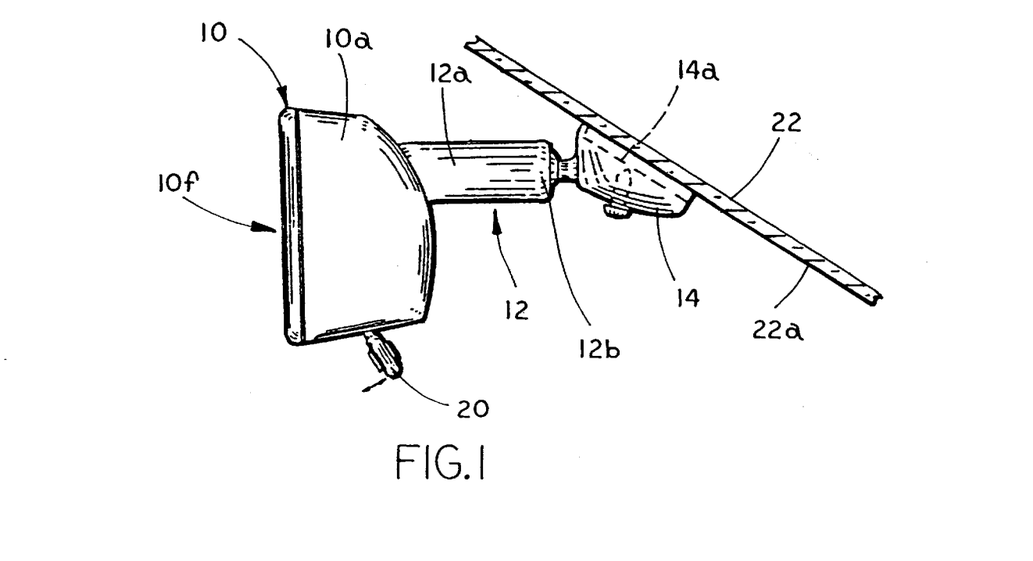
FIG. 1 is a side elevation of a mirror assembly incorporating the present invention.
Figure 2:
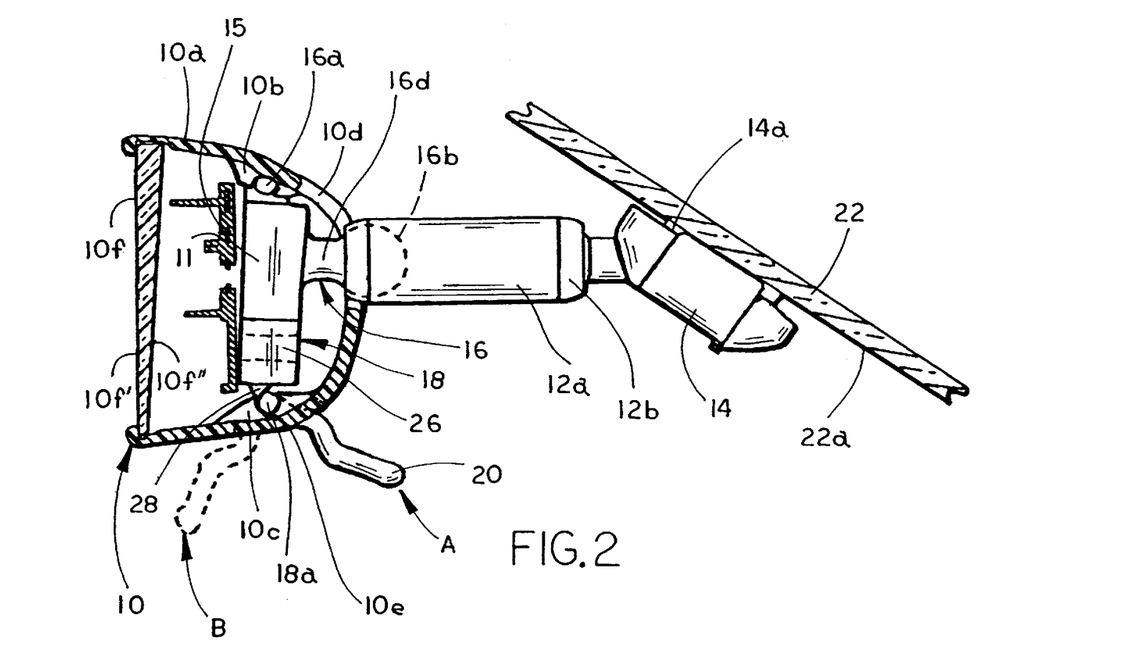
FIG. 2 is a side elevation shown partially in section of the mirror assembly of FIG. 1.

Referring now to the drawings and the illustrative embodiments depicted therein, an interior rearview mirror assembly 10 is adjustably mounted at a windshield 22 or headliner of a vehicle to accommodate different driving positions and vehicle driver sizes (FIG. 1). Preferably, mirror assembly 10 is pivotally mounted to a mounting assembly 12, which, in turn, is pivotally mounted to a mirror mount or mounting base 14. Rearview mirror assembly 10 comprises a mirror housing or casing 10a is a and a prismatic, reflective mirror element 10f. Mirror housing 10a may be formed from various materials but is preferably molded from a resinous polymeric material as is conventionally known in the industry. Mirror element 10f also may be formed from various materials such as plastic or glass, but preferably is glass, and preferably has a planar front surface 10f' extending at an angle to a planar rear surface 10f" (FIG. 2). Rear surface 10f" is preferably coated with a reflective layer of metal such as chromium, aluminum or alloys thereof as is conventionally known in the industry. Mirror assembly 10 is pivotable relative to mounting assembly 12 to pivot the reflective surface 10f" in order to reduce glare during nighttime conditions. When mirror assembly 10 is pivoted from a full reflectivity day position A to a reduced reflectivity night position B shown in FIG. 2, reflective surface 10f" is rotated clockwise such that uncoated front surface 10f' is aligned for viewing by the vehicle driver instead of reflective surface 10f'. Preferably, reflective surface 10f" reflects at least about 60% to 95% of the light incident thereon, while uncoated front surface 10f' reflects about 4% of the light incident thereon, thereby significantly reducing glare from headlights or other bright lights to the rear of the vehicle to the driver's eyes.

Mirror assembly 10 further comprises a ball and toggle assembly 15 (FIG. 2). Ball and toggle assembly 15 is pivotally mounted within housing 10a and comprises an actuator tab 20, which extends from the bottom of mirror assembly 10. As discussed below, actuation of actuator tab 20 causes mirror assembly 10 and prismatic element 10f to pivot relative to the mounting base 14 and to a driver of the vehicle.

Figure 3:
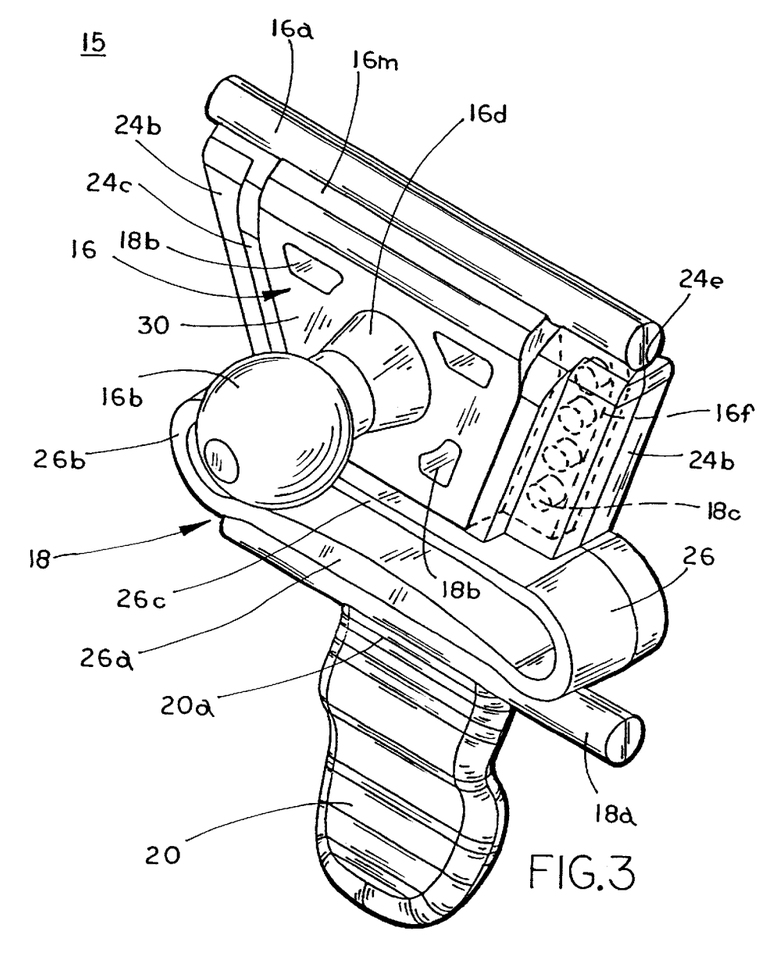
FIG. 3 is a perspective view of the ball and toggle assembly of the present invention.

As shown in FIGS. 2 and 3, ball and toggle assembly 15 is mounted within the interior cavity of mirror casing or housing 10a and comprises a ball and body member 16 and a toggle member 18. Ball and body member 16 comprises an upper pivot pin 16a and a ball member 16b, which is pivotally received in a mounting arm 12a of mounting assembly 12. Toggle member 18 comprises toggle actuator or tab 20, a lower pivot pin or axle 18a, a biasing member 26 and a living hinge 28. Ball member 16b and arm 12a provide a substantially secure, yet pivotable connection or joint to allow pivotal movement of mirror assembly 10 relative to arm 12a and windshield 22, while retaining mirror assembly 10 in a desired position. The frictional resistance between the ball member 16b and a corresponding socket of arm 12a allows for manual pivotal movement of mirror assembly 10 relative to arm 12a by an operator or passenger of the vehicle, yet resists movement of ball 16b at arm 12a in the absence of manual intervention. Preferably, ball and body member 16 comprises a substantially hard and rigid polymeric material, such as a thermoplastic material or a thermoset or the like, while toggle member 18 comprises a softer, more flexible material, such as polyolefin or thermoplastic or the like. This allows toggle member 18 to flex about living hinge 28, while rigid ball member 16b provides a stable, yet pivotable connection between mirror 10 and arm 12a of mounting assembly 12.

Figure 7:
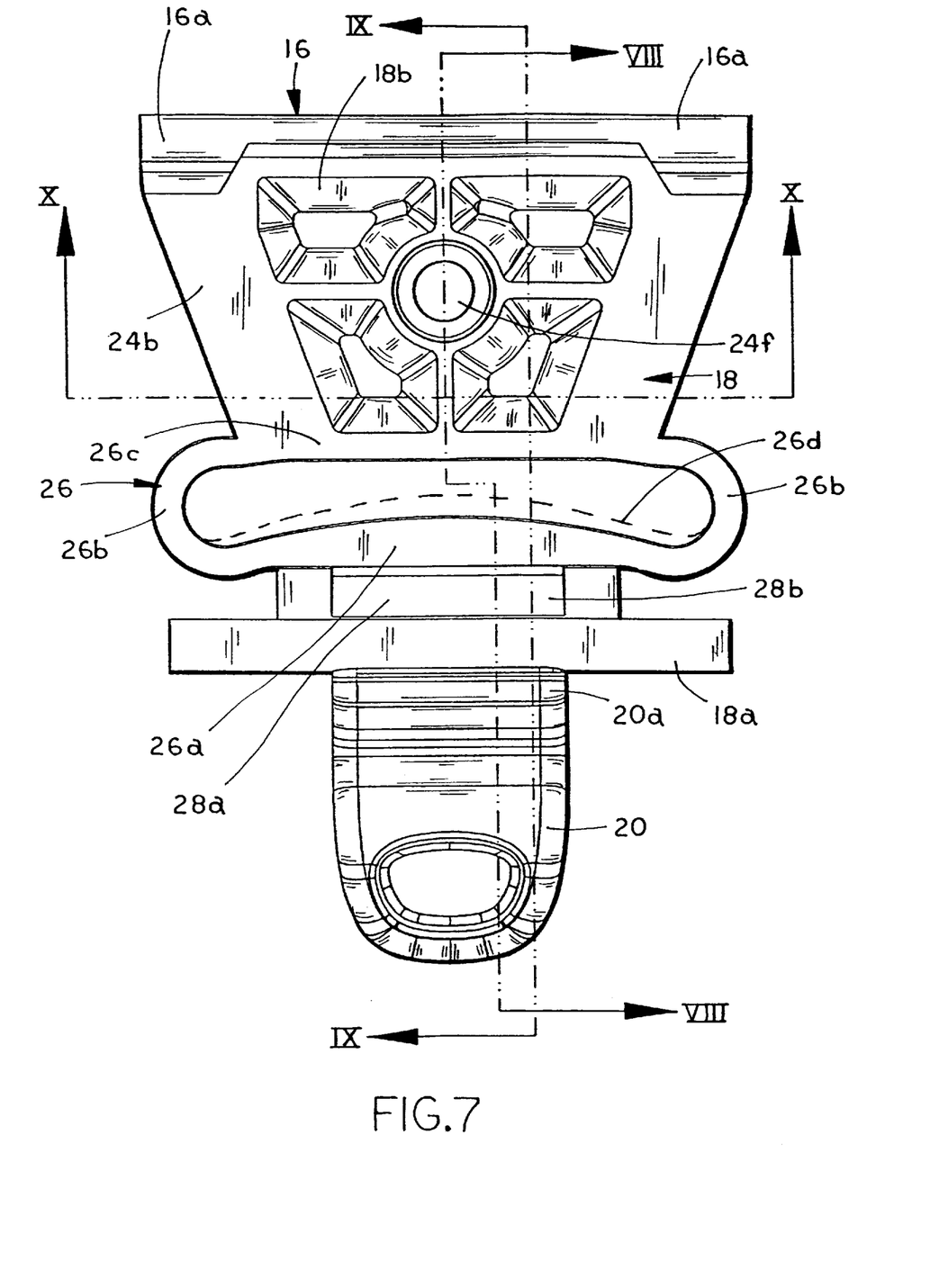
FIG. 7 is a rear elevation of the ball and toggle assembly of the present invention, viewing toward a direction generally forwardly with respect to the vehicle.

As is known in the art, upper pivot pin or axle 16a is pivotally received in one or more correspondingly formed supports, such as grooves or clips 10b, at an upper wall of casing 10a via a snap-fit connection, while lower pivot pin or axle 18a is similarly pivotally received in one or more correspondingly formed supports, such as grooves or clips 10c, at a lower wall of mirror casing 10a. By pivoting toggle arm 20 between a rearward, day position A and a forward, night position B, ball and toggle assembly 15 is operable to pivot casing 10a relative to arm 12a about upper pivot pin 16a via pivotal and translational forward and rearward movement of lower pin 18a and living hinge 28 at lower supports 10c of casing 10a. The separation distance between the upper and lower clips 10b and 10c is such that the hinge 26 is partially compressed when tab 20 is positioned centrally between day position A and night position B, as shown at 26d in FIG. 7, and thus exerts a biasing force at hinge 18b to bias and retain tab 20 in one of the two positions A and B. Mirror housing 10a further comprises an upper opening 10d, through which ball member 16b extends, and a lower opening 10e, through which tab 20 extends, to allow movement of ball member 16b and arm 12a relative to housing 10a and to allow movement of tab 20 relative to housing 10a, respectively.

Preferably, mounting arm 12a is also pivotally mounted to mounting base 14 via a ball and socket joint 12b. However, mirror assembly 10 may be pivotally mounted to an arm which is fixedly secured to the mounting base, or may be pivotally mounted directly to a socket (not shown) of a mounting base, without affecting the scope of the present invention. As shown in FIGS. 1 and 2, mounting base 14 may be secured to a mounting plate 14a (commonly referred to in the art as a mirror mounting button), which is secured to an interior surface 22a of a windshield 22. Mounting button 14a of base 14 may be secured, such as by an adhesive, to the interior surface 22a of the windshield 22 and may be a conventional mounting button, channel mount, or base member of the type disclosed in commonly assigned U.S. Pat. No. 4,936,533, issued to Adams et al., or a breakaway mount of the type disclosed in commonly assigned U.S. Pat. No. 5,820,097, issued to Spooner, or U.S. Pat. No. 5,100,095, issued to Haan et al., all of the disclosures of which are hereby incorporated herein by reference. Alternately, mounting base 14 may attach to a headliner or console (not shown) at or adjacent to an upper edge of the windshield, without affecting the scope of the present invention.

Interior rearview mirror assembly 10 may comprise additional electronic components, such as a circuit board 11 (FIG. 2), map reading lights, a speaker and/or microphone, which may be in the mirror or within a module attached to the mirror or mounting arm as disclosed in commonly assigned, co-pending U.S. patent application, Ser. No. 09/382,720, filed Aug. 25, 1999, now U.S. Pat. No. 6,243,003, an indicator for the microphone of the type disclosed in commonly assigned, co-pending U.S. patent application, Ser. No. 09/396,179, filed Sep. 14, 1999, displays, such as of the types disclosed in commonly assigned, co-pending U.S. patent application, Ser. No. 09/448,700, filed Nov. 24, 1999, communication systems, which may comprise a processing system of the type disclosed in commonly assigned, co-pending U.S. patent application, Ser. No. 09/466,010, filed Dec. 17, 1999 by Jonathan E. DeLine et al. for INTERIOR REARVIEW MIRROR SOUND PROCESSING SYSTEM, and/or the like, all of the disclosures of which are hereby incorporated herein by reference. Additionally, the interior rearview mirror assembly may comprise storage capabilities, such as disclosed in commonly assigned, co-pending U.S. patent application, Ser. No. 09/449,121, filed Nov. 24, 1999, and/or a compartment for electrical accessories, such as disclosed in commonly assigned, co-pending U.S. patent Application, Ser. No. 09/433,467, filed Nov. 4, 1999, and/or the like, the disclosures of which are hereby incorporated herein by reference. Clearly, however, the rearview mirror assembly 10 may comprise a conventional, baseline prismatic mirror, without affecting the scope of the present invention.

Figures 4, 5:
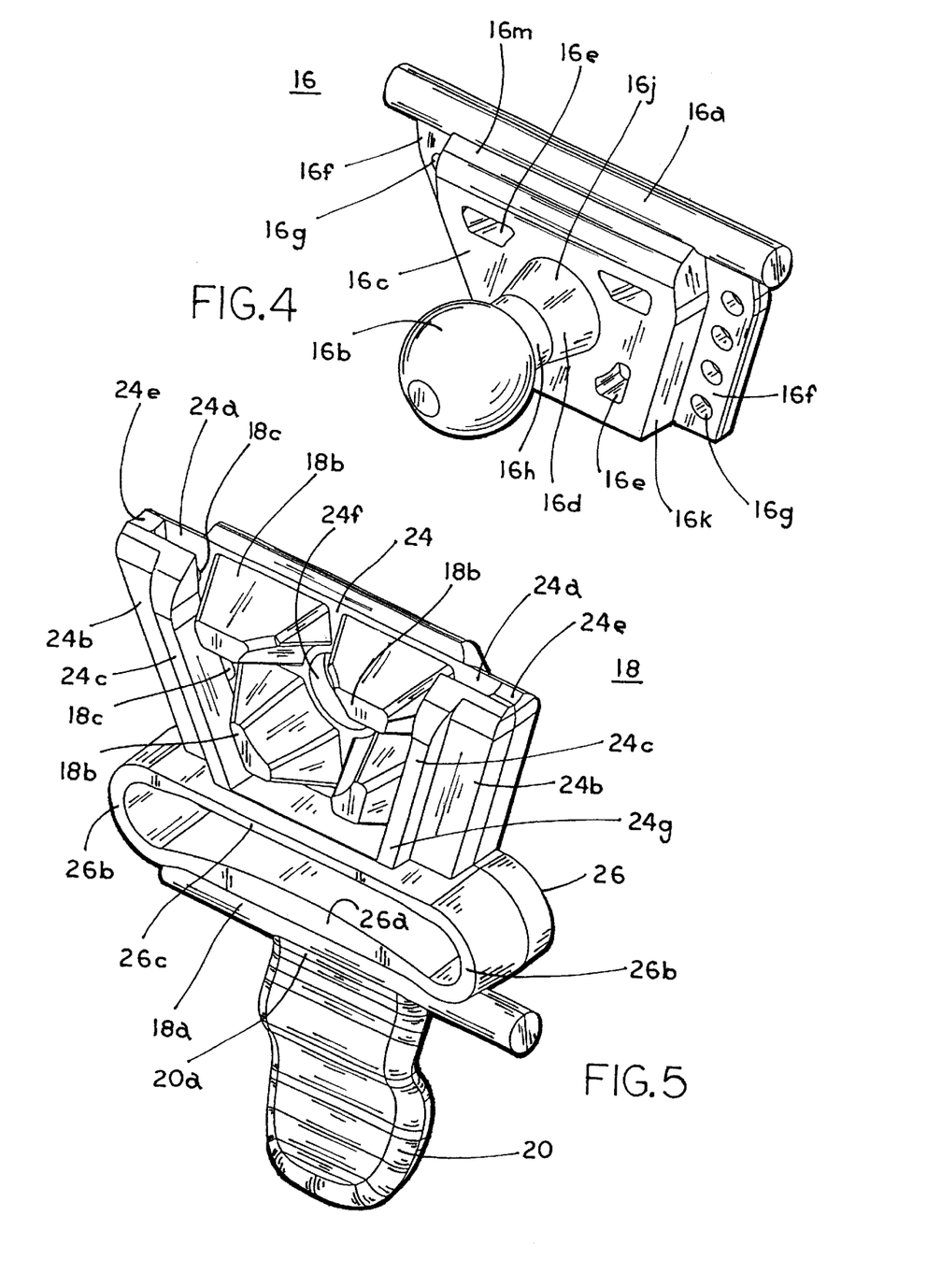
FIG. 4 is a perspective view of the ball member of the present invention.
FIG. 5 is a perspective view of the toggle member of the present invention.

Referring now to FIG. 4, ball and body member 16 comprises a base 16c and a ball member 16b extending outwardly from base 16c via a neck portion 16d. Base 16c comprises opposite side walls 16k and an upper surface 16m, along which is formed pivot pin or axle 16a. Preferably, base member 16c further comprises a pair of generally flat flanges 16f extending outwardly from either side 16k of the base region. Flanges 16f are of a narrower thickness than base region 16c and may comprise a plurality of generally cylindrical passageways 16g therethrough. Passageways 16g may be cylindrical or may be of any other shape, and receive a corresponding portion 18c of toggle member 18 when toggle member 18 is molded over body member 16, as discussed below. Upper mirror pivot pin 16a is preferably substantially cylindrical and extends laterally across upper surface 16m of base 16c and side flanges 16f. Preferably, base 16c further comprises a plurality of tapered openings or passageways 16e extending therethrough, which receive correspondingly formed tapered extensions 18b (FIG. 5) of toggle member 18 when toggle member 18 is molded about body member 16, as discussed below. Preferably, base 16c is generally square-shaped, and may be wider at an upper end to enhance the stiffness of the base member.

Preferably, ball member 16b is generally spherically shaped and may be cored or hollowed to reduce the overall weight of body member 16. Preferably, neck 16d is tapered, such that ball 16b is unitarily formed at a narrowed end 16h of neck 16d, while base 16c is molded at a wider or larger diameter end 16j. However, neck 16d may be of substantially uniform diameter, as shown in FIG. 2, without affecting the scope of the present invention. Furthermore, various sized ball and neck portions may be implemented to accommodate different mirror assemblies, without affecting the scope of the present invention. For example, a larger diameter ball member may be implemented for heavier mirror assemblies, such that a greater surface area of the ball member is provided which enhances the frictional gripping of the ball member within the mounting arm socket.

Ball and body member 16 preferably comprises a high-strength engineering polymeric material, which preferably has a flexural modulus of at least approximately 500,000 p.s.i. More preferably, the flexural modulus is at least approximately 1,000,000 p.s.i., and most preferably, at least approximately 1,500,000 p.s.i. Preferably, the high strength engineering polymer further comprises a low shrinkage factor, such that the material shrinks a minimal amount as it hardens or cures after the molding process. Preferably, the mold shrinkage is between approximately 0.001 inch/inch and approximately 0.002 inch/inch. Preferably, the high strength engineering polymer is a thermoplastic material or a thermoset or the like, such as nylon, and, more preferably, is a filled polymeric resin, such as a fiberglass filled resin or nylon, preferably at least approximately 35% glass and/or mineral filled resin. The thermoset material may further comprise a resin-rich surface, in order to minimize the fibers exposed on the surface of the ball member 16*b*. Accordingly, a highly rigid ball and body member is provided which may be cored or hollowed or may have reduced thickness to reduce the overall mass of the mirror and mounting assemblies. The ball and body member may also be molded in a desired color to match the mirror or other interior color scheme of the vehicle.

Figure 6:
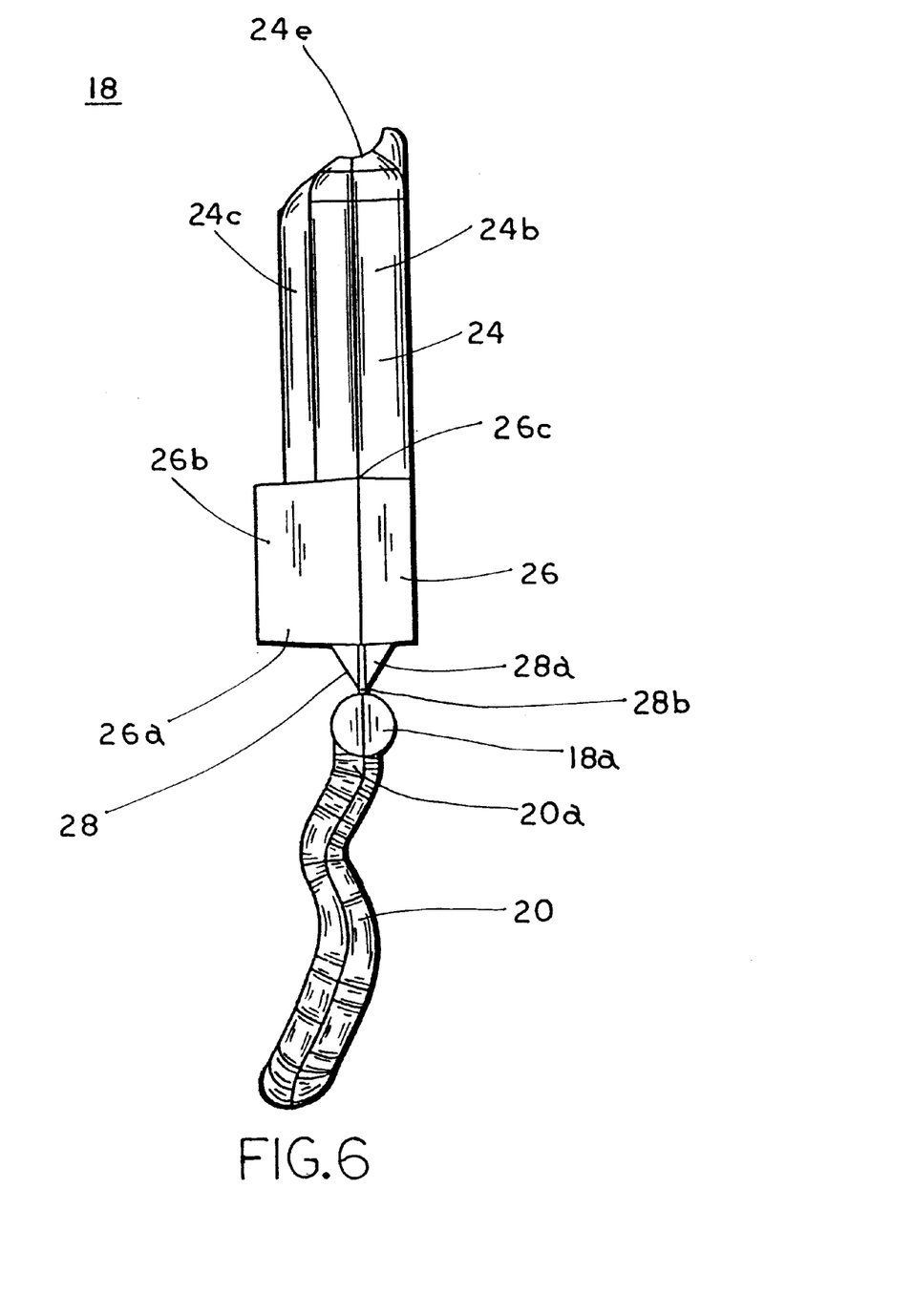
FIG. 6 is a side elevation of the toggle member of FIG. 5.

Referring now to FIGS. 5 and 6, toggle member 18 comprises a base 24, biasing member 26, hinge 28, lower pivot axle or pin 18*a*, and actuator tab 20. Base 24 may or may not further include tapered ribs or protrusions 18*b*, which are correspondingly formed with tapered recesses 16*e* in body base 16*c*, when toggle member 18 is overmolded on body member 16. The corresponding tapered portions of ball and body member 16 and toggle member 18 provide enhanced strength and stiffness to ball and toggle assembly 15 and improve the attachment of the members 16 and 18 to one another. Because toggle member 18 is molded over ball and body member 16, base 24 of toggle member 18 may further comprise channels or grooves 24*a* along its side portions 24*b*, which correspond in shape to side flanges 16*f* of base 16*c*. A plurality of generally cylindrical pins or protrusions 18*c* extend within channels 24*a*, and correspond to generally cylindrical passageways 16*g* through side flanges 16*f* of ball and body member 16. A raised side wall or ridge 24*c* may also extend from side portions 24*b* to engage sidewalls 16*k* of base 16*c*, thereby securing base 16*c* between sidewalls 24*c* and further restricting or limiting relative movement between ball and body member 16 and toggle member 18. Side portions 24*b* further comprise an upper curved surface 24*e*, which is correspondingly formed partially along pivot axle 16*a*. Additionally, a central passageway 24*f* may be formed in base 24, to further reduce the weight of toggle member 18.

Biasing member or spring 26 is molded at a lower end 24*g* of base 24 and preferably comprises a flexible, generally oval shaped member. As a lower portion 26*a* of biasing member 26 is moved toward or away from base 24, curved sidewalls 26*b* flex to allow relative movement between lower portion 26*a* and an upper portion 26*c* attached to base 24. Curved side portions 26*b* are biased in an initial orientation, as shown in FIG. 5 and generally corresponding to the day or night positions shown in FIG. 2, such that they function to exert a biasing force on lower portion 26*a* as it is moved via actuation of the actuating tab 20 between the day position A and night position B.

As best shown in FIG. 6, hinge 28 is positioned immediately beneath lower portion 26*a* of biasing member 26. Hinge 28 comprises a tapered portion 28*a*, which tapers toward a narrowed neck or hinge region 28*b*. The neck region 28*b* is immediately above and connected to lower pivot axle 18*a* and facilitates flexing of hinge 28 as toggle member 20 is pivoted relative to mirror casing 10*a*. Lower pivot axle 18*a* is preferably a generally cylindrical and laterally extending pin, and is formed along a center region between hinge 28 and at an upper end 20*a* of actuating tab 20. Preferably, actuating tab 20 extends downwardly from pivot axle 18*a* and may be curved or otherwise ergonomically formed to facilitate easy movement in either direction by a person within the vehicle.

Preferably, toggle member 18 comprises a flexible polymeric material, such as a polyolefin or other similar thermoplastic material, such as polypropylene or the like. Preferably, the material comprises a homopolymer or co-polymer material. Preferably, the polyolefin comprises a flexible material having a flexural modulus of approximately 150,000 p.s.i. to approximately 200,000 p.s.i., such that the toggle member is substantially more flexible than the ball and body member. Additionally, the mold shrinkage factor of the polyolefin material is preferably substantially greater than the shrinkage factor of the ball member. Preferably, the mold shrinkage factor is between approximately 0.010 inch/inch and 0.005 inch/inch. Because the toggle member 18 preferably comprises a material having a high shrinkage factor with respect to the shrinkage factor of the ball and body member 16, the base 24 of toggle member 18 shrinks a greater amount than ball and body member 16 as they cure and thus causes pressure on base 16*c* of ball and body member 16 inwardly toward itself. This results in substantially greater rigidity of ball and body member 16, which further enhances the strength and vibration performance of the overall ball and toggle assembly 15. Although described with preferred characteristics, clearly other materials with other flexural moduli or shrinkage factors may be implemented, without affecting the scope of the present invention. The material of toggle member 18 may also be molded in a desired color, such that the toggle arm 20 matches the mirror or an interior color scheme of the vehicles.

Figures 8, 9:
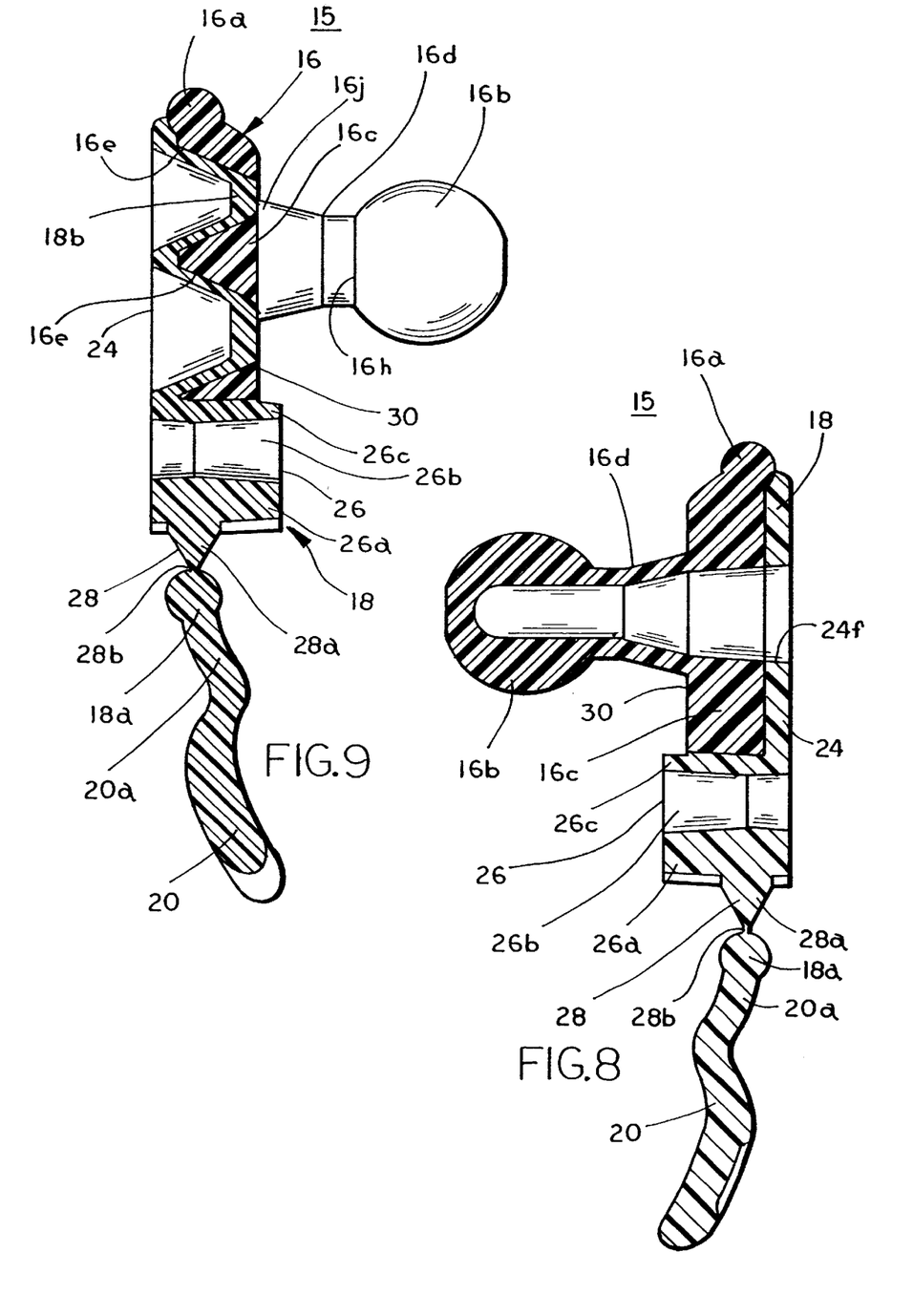
FIG. 8 is a sectional view taken along the line VIII—VIII in FIG. 7.
FIG. 9 is a sectional view taken along the line IX—IX in FIG. 7.
Figure 10:
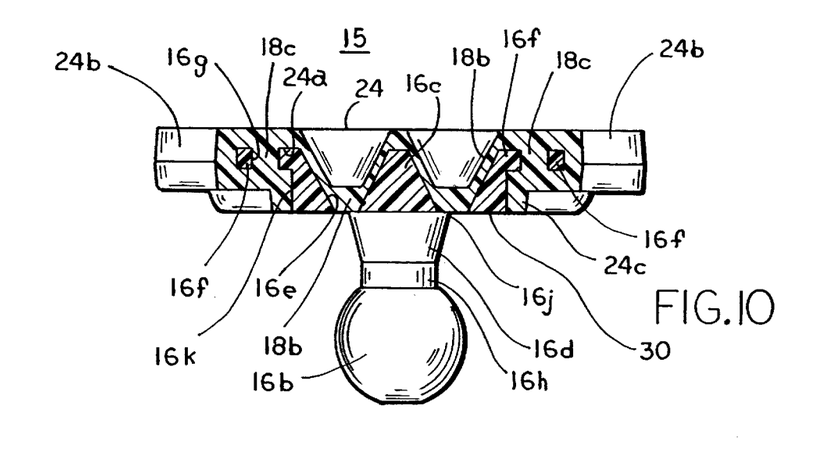
FIG. 10 is a sectional view taken along the line X—X in FIG. 7.

Referring now to FIGS. 3 and 7–10, ball and toggle member 15 is formed together by molding toggle member 18 over the previously formed, separate ball and body member 16. As shown in FIGS. 9 and 10, projections 18*b* are molded and formed within tapered passageways 16*e*, such that a substantially planar surface 30 is formed along base 16*c*. Tapered projections 18*b* of toggle member 18 are preferably hollowed projections to further reduce the mass of the assembly and increase the stiffness, thereby providing enhanced vibration performance of the assembly. However, toggle member 18 may be formed without any such projections, to provide a further reduction in the mass of toggle member 18. Neck 16*d* and ball 16*b* extend outwardly from planar surface 30 in a direction generally forwardly with respect to the vehicle and mirror. Preferably, as shown in FIG. 8, ball member 16*b*, neck 16*b* and base 16*c* of ball and body member 16 and base 24 of toggle member 18 are hollowed or cored through a center region to reduce the overall weight of the ball and toggle assembly 15. Securing pins 18*c* are molded through and within passageways 16*g* of body 16*c*, thereby providing a mechanical attachment of toggle member 18 to ball and body member 16 (FIG. 10).

Toggle member 18 is preferably molded over ball member 16 in a second shot or mold of a two-shot or two-step molding process. Such a process requires a single molding tool which positions or slides one or more mold or cavity walls between the shots or molding steps to define and form the next component, while the initial part (ball and body member 16) remains stationary. However, toggle member 18 may be molded over ball and body member 16 via any other known means, such as a rotational mold, where the ball and body member 16 is rotated into a second mold cavity for molding of the toggle member, or separate molds, where the ball and body member 16 is molded in a first mold and then removed therefrom and transferred to a second mold for molding of toggle member 18, without affecting the scope of the present invention.

Because the ball and toggle assembly may be molded together within one or more molds, the molding process is substantially improved over the assembly processes of conventional ball and toggle assemblies. By integrally molding the two components in a single mold, the present invention further avoids concerns with manual handling and alignment of the components. This results in substantially improved manufacturing time for the assembly. Preferably, the two-shot/two-step molding process is less than or equal to approximately sixty seconds in duration for both shots. More preferably, the molding process is less than or equal to approximately fifty seconds in duration, and most preferably, is less than or equal to approximately forty seconds in duration. Accordingly, substantial time and labor savings are provided by the present invention over conventional assembly processes.

Additionally, because the ball and toggle assembly of the present invention comprises polymeric materials, the ball and toggle assembly of the present invention is substantially lighter overall than a conventional ball and toggle assembly comprising a zinc ball member. Preferably, the ball and toggle assembly of the present invention is approximately 14 grams lighter than a conventional assembly.

Figures 11, 12:
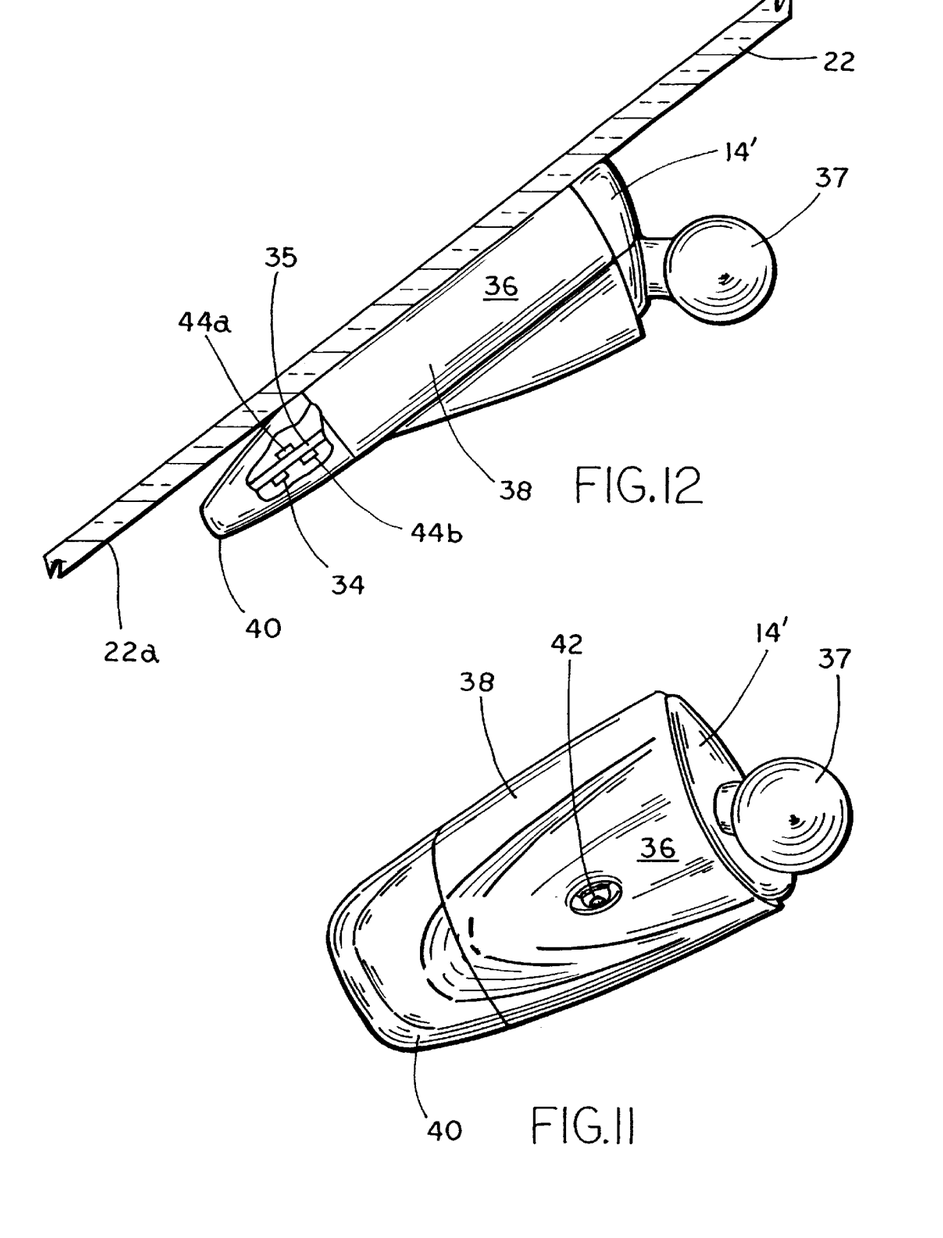
FIG. 11 is a perspective view of a mirror mount useful with the present invention.
FIG. 12 is a side elevation with partial sectional view of the mirror mount of FIG. 11.

As discussed above, various utility and/or electronic accessories can be included at, on or in the interior rearview mirror assembly. For example, and as illustrated in FIGS. 11 and 12, at least one accessory 34 may be included into a mirror mount or support element 36, which is preferably a channel mount support element positionable along an interior surface 22a of the windshield 22. The support element 36 comprises a mounting base 14', which includes a ball member 37 for pivotally mounting a mounting arm or mirror assembly thereto, a support housing 38, which is preferably plastic, such as polypropylene or the like, and a lens or accessory housing 40 extending downwardly from support housing 38. Support housing 38 may be securable to the mirror mounting base 14' via a fastener 42 or any other known means.

Accessory 34 may be positionable within lens or housing 40 of support element 36. The accessory 34 may be mounted to a circuit board 35 or otherwise secured within housing 40. Such accessories can include, for example, a light source, such as an incandescent light source or a light emitting diode (LED) or any other illumination source which is operable to illuminate a portion of the interior vehicle cabin. The incandescent light source may be a PCB mountable subminiature incandescent light, such as a miniature incandescent lamp for PC boards, commercially available from Harison Electric Co., Ltd. of Ehime, Japan as product number HRQ2-4507R or H25-4811R. Preferably, illumination is achieved using directed low level non-incandescent light sources, such as light emitting diodes (LEDs), organic light emitting material, electroluminescent sources (both organic and inorganic), and the like. Such non-incandescent sources may be low power and directed low intensity sources, such as described in U.S. Pat. No. 5,938,321 and copending application entitled "INTERIOR MIRROR ASSEMBLY FOR A VEHICLE INCORPORATING A SOLID-STATE LIGHT SOURCE", Ser. No. 09/287,926, filed Apr. 7, 1999, now U.S. Pat. No. 6,139,172, which are incorporated herein by reference in their entireties. Alternately, the light source may be a neon lamp or fluorescent lamp, such as a cold cathode fluorescent lamp, or may be a halogen lamp, or other gas light source, such as an Argon lamp or the like. Most preferably, the light source is a white light emitting diode for illuminating the vehicle cabin. For example, the light source may comprise an instrumentation/console light for consoles or may be a reading or map light. In such applications, it is preferred that the accessory comprise a plurality of light sources or LEDs, preferably white light emitting diodes, with the light therefrom being directed to illuminate a target area of the vehicle, such as the driver and/or passenger lap area. The light source 34 and/or the circuit board 35 may be angled or otherwise oriented to direct the illumination toward the targeted area. Additionally, lens 40 may direct and focus the light from light sources 34 at the targeted area. The light source or accessory 34 may be activated by a button or switch at the mirror assembly or elsewhere in the vehicle and/or by activation of a remote key fob and/or by opening a door of the vehicle.

It is also possible to incorporate low level lighting for vehicles in the mirror mount by fitting a low level non-incandescent light emitting light source, such as a light emitting diode, such as for illuminating an instrument panel or console as disclosed in commonly assigned U.S. Pat. No. 5,671,996, the disclosure of which is hereby incorporated by reference. A variety of emitting sources may be used, such as high intensity amber and reddish orange light emitting diode sources, such as solid state light emitting diode LED sources utilizing double hydro junction AIGaAs/GaAs Material Technology, such as very high intensity red LED lamps (5 mm) HLMP-4100/4101 available from Hewlett Packard Corporation of Palo Alto, Calif., or transparent substrate aluminum indium gallium phosphide (AlInGaP) Material Technology, commercially available from Hewlett Packard Corporation of Palo Alto, Calif. Also, blue or white LEDs can be used, or a combination of individual different colored diodes, such as red, blue, white, green, amber, orange etc. can be used with color mixing thereof to form a desired color or to deliver a desired local intensity of illumination. White emitting light-emitting diodes are available from Nichia Chemical Industries of Tokyo, Japan and from Cree Research Inc., of Durham, N.C. For example, a white light emitting diode is available from Nichia Chemical Industries of Tokyo, Japan under Model Nos. NSPW 300AS, NSPW 500S, NSPW 310AS, NSPW 315AS, NSPW 510S, NSPW 515S and NSPW WF50S, such as is disclosed in U.S. patent application Ser. No. 09/448,700, entitled "Rearview Mirror Assembly With Added Feature Modular Display", filed Nov. 24, 1999 by Timothy G. Skiver et al. of Donnelly Corporation, and in U.S. patent application Ser. No. 09/244,726 entitled "Rearview Mirror Assembly Incorporating Vehicle Information Display", filed Feb. 5, 1999 by Jonathan E. DeLine et al. of Donnelly Corporation, now U.S. Pat. No. 6,172,613 the entire disclosures of which are hereby incorporated by reference herein. A variety of constructions are used including GaAsP on GaP substrate, gallium aluminum phosphide, indium galium nitride, and GaN on a SiC substrate. Optionally, a plurality of LEDs such as a cluster of two, three, four, six, eight or the like LEDs (each of the same color or the cluster comprising different colored LEDs) can be used to target and illuminate a local area for higher illumination at that area, such as may be useful in a map light or as a reading light or as an interior light or as an illumination source for an interior vehicle cabin-mounted and monitoring camera (most preferably illuminating the target area with white light). Such a cluster of high efficiency LEDs can be mounted at the mirror mount so as to project an intense pattern of light generally downwardly into the vehicle cabin for purposes of map reading, general illumination, courtesy illumination and the like. Also, a cluster of LED's, preferably including at least one white emitting LED and/or at least one blue emitting LED, can be mounted in a roof portion, side portion or any other portion of the vehicle cabin to furnish dome lighting, rail lighting, compartment lighting and the like. Use of white emitting LEDs is disclosed in U.S. patent application Ser. No. 09/249,979, now U.S. Pat. No. 6,152,590 entitled "Lighting Device For Motor Vehicles", filed Feb. 12, 1999 by Peter Fuerst and Harald Buchalla of Donnelly Hohe Gmbh & Co, KG, the entire disclosure of which is hereby incorporated by reference herein.

Alternately, accessory 34 may be an indicator light that preferably intermittently flashes to signal or indicate status of a vehicle function, such as arming of a vehicle security system which protects against vehicle theft. The indicator may be a solid state light emitter such as a light emitting diode (LED), a phosphorescent element or display or a tell-tale, such as an LED backlit icon. However, the indicator may otherwise be an incandescent bulb, an incandescent backlit tell-tale, or any other illumination source, without affecting the scope of the present invention. Alternately, or in combination with a light source, other accessories 44a and/or 44b, such as a microphone or microphones, an attachment member for a map, a compass sensor, such as a magneto responsive sensor, a magneto resistive sensor, a magneto inductive sensor, a magneto capacitive sensor, or a flux gate sensor, such as are known in the compass arts, an antenna, a manual interface button, such as for ONSTAR systems and the like, and/or any other accessories, may be positioned at the mirror mount. Most preferably, an electrical wiring (not shown) connecting the accessory to a vehicle wiring can be conduited through the channel mount or attached to the exterior surface thereof. By positioning an accessory or indicator above the dashboard at the mirror mount, the accessory is more readily viewable by a driver or passenger of the vehicle, since the driver does not have to look down toward the dashboard or instrument panel to view the indicator.

Accordingly, the present invention provides an integrally or separately molded ball and toggle assembly, which provides a substantially rigid and strong ball and neck member, while further providing a substantially flexible spring, hinge, and actuating tab. The ball member comprises a high-strength engineering polymeric material which has a greater flexural modulus than the flexural modulus of the polymeric material of the toggle member. Preferably, the ratio of the flexural modulus of the polymeric material of the ball and body member to the flexural modulus of the polymeric material of the toggle member is at least about three or greater. More preferably, this ratio is at least about five or greater and, most preferably, at least about seven or greater.

Because the ball and body member and the toggle member are both molded from polymeric materials, the components may be molded in a desired color to match the color of each other, the mirror, the mounting assembly, and/or an interior color scheme of the vehicle. By molding the ball and body member out of a plastic material, the weight of the ball and toggle assembly is reduced relative to conventional, zinc ball members, while still providing adequate strength and vibration performance. Additionally, the ball and body member may be cored or hollowed to further reduce the weight of the assembly.

Changes and modifications in the specifically described embodiments may be carried out without departing from the principles of the invention, which is intended to be limited only by the scope of the appended claims, as interpreted according to the principles of patent law.

What is claimed is:

1. A ball and toggle assembly adapted for use in an interior, prismatic, day/night rearview mirror assembly of a vehicle, comprising:
    a body member having a ball member and a base, said body member being formed from a first polymeric material comprising a first flexural modulus; and
    a toggle member comprising a hinge and an actuator tab, said toggle member formed from a second polymeric material comprising a second flexural modulus, said body member and said toggle member being joined together for support in a mirror housing of the rearview mirror assembly, said first flexural modulus being greater than said second flexural modulus, said first polymeric material of said body member comprising one of a thermoplastic and a thermoset, wherein said first polymeric material of said body member comprises a filled polymeric resin.

2. The ball and toggle assembly of claim 1, wherein said first polymeric material comprises a filled polymeric resin having a resin rich surface.

3. The ball and toggle assembly of claim 1, wherein said second polymeric material of said toggle member comprises a polyolefin.

4. The ball and toggle assembly of claim 3, wherein said second polymeric material comprises at least one of a homopolymer polypropylene and a copolymer polypropylene.

5. A ball and toggle assembly adapted for use in an interior, prismatic, day/night rearview mirror assembly of a vehicle, comprising:
    a body member having a ball member and a base, said body member being formed from a first polymeric material comprising a first flexural modulus; and
    a toggle member comprising a hinge and an actuator tab, said toggle member formed from a second polymeric material comprising a second flexural modulus, said body member and said toggle member being joined together for support in a mirror housing of the rearview mirror assembly, said first flexural modulus being greater than said second flexural modulus, wherein said first flexural modulus of said first material is greater than approximately 500,000 p.s.i.

6. The ball and toggle assembly of claim 5, wherein said first flexural modulus of said first polymeric material is greater than approximately 1,000,000 p.s.i.

7. The ball and toggle assembly of claim 5, wherein said first flexural modulus of said first polymeric material is greater than approximately 1,500,000 p.s.i.

8. The ball and toggle assembly of claim 5, wherein said second flexural modulus of second polymeric material is less than approximately 200,000 p.s.i.

9. A ball and toggle assembly adapted for use in an interior, prismatic, day/night rearview mirror assembly of a vehicle, comprising:
    a body member having a ball member and a base, said body member being formed from a first polymeric material comprising a first flexural modulus; and
    a toggle member comprising a hinge and an actuator tab, said toggle member formed from a second polymeric material comprising a second flexural modulus, said body member and said toggle member being joined together for support in a mirror housing of the rearview mirror assembly, said first flexural modulus being greater than said second flexural modulus, wherein said second polymeric material of said toggle member has a shrinkage factor of at least approximately 0.005 inch/inch and said first polymeric material of said body member has a shrinkage factor of less than approximately 0.002 inch/inch.

10. A ball and toggle assembly adapted for use in an interior, prismatic, day/night rearview mirror assembly of a vehicle, comprising:
    a body member having a ball member and a base, said body member being formed from a first polymeric material comprising a first flexural modulus; and a toggle member comprising a hinge and an actuator tab, said toggle member formed from a second polymeric material comprising a second flexural modulus, said body member and said toggle member being joined together for support in a mirror housing of the rearview mirror assembly, said first flexural modulus being greater than said second flexural modulus, said toggle member being molded at least partially around said body member, wherein said body member includes a plurality of through openings, said toggle member being molded in said through openings to mechanically secure said toggle member to said body member.

11. A ball and toggle assembly adapted for use in an interior, prismatic, day/night rearview mirror assembly of a vehicle, comprising:
a body member having a ball member and a base, said body member being formed from a first polymeric material comprising a first flexural modulus; and
a toggle member comprising a hinge and an actuator tab, said toggle member formed from a second polymeric material comprising a second flexural modulus, said body member and said toggle member being joined together for support in a mirror housing of the rearview mirror assembly, said first flexural modulus being greater than said second flexural modulus, wherein a ratio of said first flexural modulus of said first polymeric material to said second flexural modulus of said second polymeric material is greater than approximately three.

12. The ball and toggle assembly of claim 11, wherein said ratio of said first flexural modulus of said first polymeric material to said second flexural modulus of said second polymeric material is greater than approximately five.

13. The ball and toggle assembly of claim 11, wherein said ratio of said first flexural modulus of said first polymeric material to said second flexural modulus of said second polymeric material is greater than approximately seven.

14. The ball and toggle assembly of claim 11, wherein said toggle member is molded at least partially around said body member.

15. The ball and toggle assembly of claim 11, wherein said assembly is molded in a two step process, said body member being molded in a first step and said toggle member being molded at least partially about said body member in a second step.

16. The ball and toggle assembly of claim 15, wherein said two step molding process is performed by one of a rotatable mold, a single mold, and separate molds.

17. The ball and toggle assembly of claim 11, wherein said body member and said toggle member are integrally molded together.

18. The ball and toggle assembly of claim 11, wherein said body member further comprises an upper pivot joint for pivotally engaging a support when mounted in the mirror housing.

19. The ball and toggle assembly of claim 11, wherein said ball member is connected to said base via a neck portion, said neck portion being tapered such that said neck portion narrows at an outer end toward said ball member.

20. The ball and toggle assembly of claim 11, wherein said toggle member further comprises a biasing member, said biasing member being integrally formed with said toggle member, said biasing member being operable to exert a biasing force at said hinge to resist movement of said actuator tab from at least one of a day and night position.

21. The ball and toggle assembly of claim 11, wherein said body member and said toggle member are formed in a matching color.

22. The ball and toggle assembly of claim 21, wherein said matching color matches a color of the mirror housing of the rearview mirror assembly.

23. The ball and toggle assembly of claim 11, wherein said base of said body member includes at least one rib for enhanced vibration performance.

24. The ball and toggle assembly of claim 11, wherein said ball member of said body member is cored.

25. An interior rearview mirror assembly for vehicles, comprising:
a mirror housing having a forward surface;
a prismatic, reflective mirror element supported by said mirror housing, said mirror housing and said prismatic mirror element being pivotable relative to the vehicle between a first reflectivity position and a second reflectivity position; and
a ball and toggle assembly mountable to said housing and comprising:
a body member including a mounting member and a base, said body member being pivotally mounted in said mirror housing; and
a toggle member including a hinge and an actuator tab, said toggle member being pivotally mounted in said mirror housing adjacent to said body member, said ball and toggle assembly being operable such that movement of said actuator tab about said hinge causes pivotal movement of said mirror housing and said reflective mirror element between said first and second reflectivity positions relative to said mounting member, wherein said body member comprises a first polymeric material having a first flexural modulus and said toggle member comprises a second polymeric material having a second flexural modulus, said first flexural modulus being greater than said second flexural modulus, said body member and said toggle member being joined together.

26. The interior rearview mirror assembly of claim 25, wherein said first polymeric material of said body member comprises one of a thermoplastic and a thermoset.

27. The interior rearview mirror assembly of claim 26, wherein said first polymeric material of said body member comprises a filled polymeric resin.

28. The interior rearview mirror assembly of claim 27, wherein said first polymeric material comprises a filled polymeric resin having a resin rich surface.

29. The interior rearview mirror assembly of claim 26, wherein said second polymeric material of said toggle member is different from said first polymeric material, said second polymeric material including at least one of a polyolefin and a thermoplastic.

30. The interior rearview mirror assembly of claim 29, wherein said second polymeric material includes at least one of a homopolymer polypropylene and a copolymer polypropylene.

31. The interior rearview mirror assembly of claim 25, wherein said second polymeric material of said toggle member is different from said first polymeric material, said second polymeric material including at least one of a polyolefin and a thermoset.

32. The interior rearview mirror assembly of claim 31, wherein said second polymeric material includes at least one of a homopolymer polypropylene and a copolymer polypropylene.

33. The interior rearview mirror assembly of claim 25, wherein said first flexural modulus is greater than approximately 500,000 p.s.i.

34. The interior rearview mirror assembly of claim 33, wherein said second flexural modulus is less than approximately 200,000 p.s.i.

35. The interior rearview mirror assembly of claim 25, wherein said first flexural modulus is greater than approximately 1,000,000 p.s.i.

36. The interior rearview mirror assembly of claim 25, wherein said first flexural modulus is greater than approximately 1,500,000 p.s.i.

37. The interior rearview mirror assembly of claim 25, wherein a ratio of said first flexural modulus of said first polymeric material to said second flexural modulus of said second polymeric material is greater than approximately three.

38. The interior rearview mirror assembly of claim 25, wherein a ratio of said first flexural modulus of said first polymeric material to said second flexural modulus of said second polymeric material is greater than approximately five.

39. The interior rearview mirror assembly of claim 25, wherein a ratio of said first flexural modulus of said first polymeric material to said second flexural modulus of said second polymeric material is greater than approximately seven.

40. The interior rearview mirror assembly of claim 25, wherein said second polymeric material of said toggle member comprises a shrinkage factor of at least approximately 0.005 inch/inch and said first polymeric material of said body member comprises a shrinkage factor of less than approximately 0.002 inch/inch.

41. The interior rearview mirror assembly of claim 25, wherein said mounting member is a ball member which is pivotally interconnectable to a mounting base secured to the vehicle such that said mirror is pivotable relative to said mounting base.

42. The interior rearview mirror assembly of claim 25, wherein said body member and said toggle member are integrally molded together.

43. The interior rearview mirror assembly of claim 25, wherein said toggle member is molded at least partially around said base of said body member and secured thereto via mechanical connection of said second polymeric material with said first polymeric material.

* * * * *